United States Patent [19]

Zaltman

[11] Patent Number: 5,436,830
[45] Date of Patent: Jul. 25, 1995

[54] METAPHOR ELICITATION METHOD AND APPARATUS

[76] Inventor: Gerald Zaltman, 25 Exeter St., Boston, Mass. 02116

[21] Appl. No.: 11,867

[22] Filed: Feb. 1, 1993

[51] Int. Cl.$^6$ .............................................. G06F 15/38
[52] U.S. Cl. .................... 364/419.2; 364/401
[58] Field of Search ............. 364/419.20, 401; 434/322, 212, 358

[56] References Cited

U.S. PATENT DOCUMENTS 5,084,819  1/1992  Dewey et al. .................. 364/419
5,124,911  6/1992  Sack ................................. 364/401

OTHER PUBLICATIONS

Freeman, Meryl, "Creating an image", Marketing & Media Decisions, vol.: v23 Issue: n2 PG:p. 102(3), Feb. 1988.
Reichert, W. T., "Employing Incongruency As A form of Communication-Relevant Distraction To Enhance Attitude Change In An *Advertising* Context", The University of Arizona (0009), vol. 31/04 of Masters Abstracts, p. 1419.
Durgee, Jeffrey, "Qualitative Methods For Developing Advertising That Makes Consumers Feel, 'Hey That's Right For Me'", Journal of Consumer Marketing v7n1, pp. 15–21, Winter 1990.

*Primary Examiner*—Gail O. Hayes
*Assistant Examiner*—Frantzy Poinvil
*Attorney, Agent, or Firm*—Jon L. Roberts; Thomas M. Champagne; Roberts & Associates

[57] ABSTRACT

A method and apparatus for eliciting customer input to construct advertising/marketing campaigns. The metaphor elicitation technique method and apparatus provides a series of steps on an apparatus for eliciting from a customer the important aspects associated with a particular topic about which a marketing program is to be devised. The customers interact with a file of images which are designed to pictorially represent important sensory aspects of a topic being studied. The images and subsequent graphical maps and related constructs are then used to create an appropriate marketing/advertising campaign for the product or subject matter being studied.

14 Claims, 2 Drawing Sheets

METAPHOR ELICITATION METHOD AND APPARATUS

FIELD OF THE INVENTION

This invention relates to a process and apparatus whereby a marketing campaign may be established. More specifically, it relates to a process and apparatus whereby a marketing model may be constructed based upon thinking and behavior of customers.

BACKGROUND OF THE INVENTION

The consuming public is exposed to numerous marketing campaigns attempting to convey information to them. The most obvious attempt involves mass media advertising. However, important information is also conveyed through the design of products and packages, the design of store or purchase settings, the type of distribution channel used, and even through pricing practices.

Some campaigns are very successful and others are often failures. Two major factors distinguish these campaigns from one another: (1) how well a company understands its customers, and (2) how well it uses this understanding in making key decisions about advertising, product features, and other marketing variables.

The creation of satisfied customers is a function of a company's competence in both factors.

It is well established that most communication occurs nonverbally (Weisner, 1988; Knapp, 1981; Seiter, 1987). Thus customers "say" and "hear" a great deal more through nonverbal rather than verbal means of communication. However, virtually all market research tools rely on verbal means of communication such as questionnaires, telephone interviews, face-to-face interviews and discussions or focus groups.

Because companies rely so much on verbally oriented research tools they often miss much of what customers "say" and "hear" nonverbally. Thus companies often miss important opportunities to understand customers better and to communicate better with them. As a consequence, customers and the companies serving them become less well off.

The use of photographs as a social science research tool has also been growing. A few customer behavior researchers have begun using photographs as a way to document important possessions and their meaning to customers. Such techniques provide further insight into the thought process of customers thereby giving researchers a better idea of how a customer perceives the images that would appear in marketing campaigns.

Graphical means for analyzing networks is also known. In the area of social network analysis, computer packages exist to give a visual presentation to relationships in society. (Sage Publications, 1991; Knoke, 1990). These tools, while used for analysis of social relationships have not been applied to evaluation and relationships among factors in a commercial/marketing setting.

The present invention entitled the Metaphor Elicitation Technique utilizes these various research techniques to create a visually and other sensory oriented method and apparatus for creating research for marketing campaigns or to validate the thrust of an existing marketing campaign to determine if it accomplishes its stated purpose.

BRIEF DESCRIPTION OF THE INVENTION

The Metaphor Elicitation Technique (MET) process and apparatus provides a way to conduct research in marketing which provides reliable and valid customer information in the form that creative advertising staffs, product design staffs, and other decision makers in a marketing campaign team find helpful. The process and apparatus of the present invention is based on the establishment of metaphors used by customers. For purposes of this application a "customer" is an individual whose opinions, observations and sensory input are being elicited. A metaphor is the understanding and experiencing of one thing in terms of another. For example, a person may see a picture of an American flag as reflecting a sense of patriotism and hence be representative of his or her commitment to an American auto manufacturer.

A visual image (in this case digital) is a necessary part of the present invention. A visual image is an external or internal mental pictorial representation of an idea, object, process, or event. External pictures such as photographs, and internal mental images such as those in the "mind's eye" are sources of important metaphors. Both external and mental pictorial images are valid, reliable, convenient, and natural ways for customers to express important values, thoughts and feelings.

A mental image is a key element used during the course of the present invention. The mental image is the imagining of an external object or event using various senses stored by the mind. A mental image is essentially memory and constitutes stored understanding. A mental image can be retrieved fully or partially as necessary to replicate a prior thought or contribute to the creation of a new one. A mental image may involve one or more of the senses of touch, smell, taste, hearing, and sight as well as emotional states or feelings. The nonvisual sensory images which may also be stored digitally in a direct or indirect form are also a necessary part of the present invention.

All sensory images are important nonverbal means of communication. Multiple sensory images are also important in the present invention since one sensory image such as sight can trigger the experience of another sensory image such as taste. This kind of connection among senses is known technically as synesthesia.

A construct in the context of the present invention is a bipolar description relating to a customer's thought orientation. In our prior example, an image of an American flag (a metaphor) may express the construct "patriotic/unpatriotic" which might in term give rise to the construct "purchase American cars/do not purchase American cars." The construct reveals thinking that guides a customer's behavior.

A mental model is a set of related constructs that drive a customer's thinking and behavior. A mental model is a set of "if/then" causal connections. Mental models can be presented in diagrammatic form showing which constructs affect or are affected by others.

Photo elicitation is a process whereby a person describes the significance or meaning of photographs or images presented to the person.

Finally, a consensus map is a diagrammatic metaphor for representing and understanding the preferences, opinions, and feelings of the customer. It describes the thinking of customers by synthesizing the mental models of individuals into an overall diagrammatic metaphor. It is, in fact, the major end product of the MET apparatus and process and is the guide to marketing staffs in the creation of advertising campaigns or formulating other marketing decisions and actions.

The MET comprises the following steps:

Step 1. Storytelling. The customer describes the content of relevant visual images and how they are associated with the research topic for that customer. The images selected for the baseline series of images for evaluation for a topic under study.

Step 2. Sorting Task. The customer sorts images into meaningful groups.

Step 3. Identifying and Recording Sensory Metaphors. The customer identifies what is and what is not a good sensory representation of the research topic, in terms of sound, shape, tactile sensation, color, taste, smell or scent, and emotional feeling.

Step 4. Further Construct Elicitation A formal interviewing process in which pictures and other sensory stimuli are used to understand customer thinking about the research topic. The constructs elicited in this step augment those elicited in Steps 1–3.

Step 5. Most Representative Image. The customer indicates which picture (from a given set of pictures) is most representative of the research topic (e.g., the meaning of luxury).

Step 6. Verbal Description of Missing Images. The customer describes relevant pictures that he or she was unable to find or obtain and explains their relevance.

Step 7. Identifying Opposite Images. The customer identifies pictures that describe the opposite of the topic (e.g., what is not luxury).

Step 8. Company Perceptions of Customers. (as understood by customers) Using sensory metaphors, the customer describes what a company and/or key people, e.g. car designers, sales personnel, etc. think of them. (This is important since a customer's response to a company is also influenced by this perception.)

Step 9. Critical Message to the Company. The customer describes the single most important message they want to convey to a company on the research topic. The customer selects the sensory images that best reflect this message.

Step 10. Surprise to the Company. The customer describes which of his or her feelings or thoughts on the topic a relevant company is least prepared to hear. The customer selects the sensory images that best convey this information.

Step 11. The Mental Map. The customer creates a map or a causal model using the constructs which have been elicited to express the customer's overall thinking about the research topic.

Step 12. Creation of a Summary Image. The customer with the aid of a technician creates a single, still image (visual) which best summarizes the meaning of the research topic.

Step 13. Creation of a Vignette or Mental Video. The customer, with the aid of a technician creates a movie-like vignette or video expressive of the research topic. This is done using animation. (Note: Steps 12 and 13 typically provide different but complementary information)

Step 14. Creation of the Consensus Map. The diagrammatic metaphor representing the researcher's understanding of customer thinking. It consists of customers' most important constructs and their interrelationships. It describes most of the thinking of most customers. It is an integration of information provided by all customers participating in a project. Special analytic techniques are employed with the data used to construct the consensus map to determine whether market segments or subclusters of customers can be identified within the consensus map. Thus one submap within the consensus map may be especially descriptive of one subgroup of customers and another submap especially descriptive of another group's thinking. This analysis enhances the value of the consensus map in developing a marketing campaign.

The MET Apparatus

In order to effectuate the steps of the MET an apparatus is provided whereby a researcher, in conjunction with each customer participating in a given research project, obtains the information needed to create the ultimate consensus map. The apparatus comprises a file of digital images from which are selected a series of images used for the storytelling step (Step 1). The customer is able to add images to this file.

A digital sound recording is made of the customer's story telling. The apparatus of the present invention appends the digital sound recording to the digital image. The (digital) voice recording contains what is technically called paralanguage. Paralanguage consists of tone, inflection, and other cues or factors relating to how something is said. These factors convey important meaning beyond the actual words used and may even contradict those words. Paralanguage is generally considered a nonverbal dimension of communication.

The Sorting Task (Step 2) is accomplished by designating and sorting the various images retrieved, again using automated means of designating the images into different groups. For example, a customer can "designate" which pictures fit into a particular group or group designation via a cursor or other keyboard input means.

The Sensory Metaphor step (Step 3) can also be accomplished via the apparatus whereby a customer selects from a file or bank of sensory images those that are most expressive of the topic. These sensory images are stored digitally and represent an array of sounds, colors, shapes, and descriptions of smells, touches, etc. The customer is able to add descriptions to this digital file. These images are metaphors. A digital sound recording is made of the customer's description/selection of these images.

Step 1, 2, and 3 identify some important constructs customers use. Additional constructs are also elicited (Step 4) using a specific interviewing procedure. The sensory images or metaphors the customer has identified in steps 1, 2, and 3 are used as the stimuli for this conversation. The apparatus of the present invention contains these images and also a procedure for conducting the conversation. This procedure involves a set of specifically designed thinking probes to help the customer express their feelings, thoughts, and values.

The Most Representative Picture (Step 5) is also designated via the pointing/selection apparatus of the present invention.

Verbal descriptions of relevant images (Step 6) not available at the time of the interview are provided by a customer. Verbal records of these images are stored in the system. These images comprise scenes/pictures designated by the customer as providing additional information about the topic under study.

Opposite Images (Step 7) are also presented to or selected by a customer based upon the customer's statements. These images are stored on a separate database of digital images.

The customer describes how he or she thinks a company involved with the research topic thinks of them (Step 8). Customers may feel that they are thought of in negative or positive ways. Customers select sensory images (visual, tactile, sound, etc.) from the image file or bank which they believe reflect how a company thinks of them. The customer's voice (audio) is recorded digitally on the apparatus of the present invention as he or she provides this information and is connected to the appropriate image.

The critical message to the company (Step 9) and the surprise to the company (Step 10) are illustrated by the customer using various visual and other sensory metaphors in the image file or bank. The customer's verbal commentary is recorded digitally (in audio) by the apparatus and connected to the appropriate images.

The Mental Map (Step 11) is a series of recorded constructs or images created by the customer and stored in the system. These mental maps constitute accurate representations of ideas important to the customer and how they relate to one another. The set of constructs elicited through earlier steps are brought up on the display device of the apparatus. These are validated by the customer. The customer then establishes connections among the constructs using a mouse, cursor, or pressure sensitive digitizing tablet (using a stylus or even a finger.)

A composite or summary digital image is created next (Step 12) using a form of "clip art" common to many desk top publishing systems and an image management system stored in the CPU. A technician assists the customer in the use of the software. A customer's own pictures often form the starting point for this step. A digital voice recording is made of the customer's explanation of this summary image and is appended to the image as part of the record.

The customer's description of a movie-like vignette (Step 13) describing the research topic is recorded. That is, the customer's voice is digitally recorded (as in earlier steps) as this vignette is described. The customer then directs a technician in the creation of an animated representation of this vignette using standard computer video animation techniques. The customer's digitally recorded (audio) description is appended to this vignette.

The final creation of a consensus map (Step 14) is essentially the summation of all of the data created by individual customers using the apparatus. The consensus map contains verbal labels for each major construct. Constructs that are related to one another are connected with arrows. The researcher or marketing manager is able to click (with a mouse or other device) on a particular construct. When this is done the most relevant pictures and other sensory metaphors associated with that construct appear on the computer screen or other display device. Where appropriate, the digitally recorded voices of customers commenting on the pictures or other sensory metaphors are also presented. The researcher or marketing manager may also click on an arrow connecting any two constructs and retrieve a verbatim text and/or audio statement from one or more customers describing how one construct affects the other.

The researcher or marketing manager is also able to review all animated vignettes created in Step 13. These vignettes are indexed to constructs in the consensus map and to their interrelationships. Thus, it is possible to see and hear an animated enactment of a construct and its impact on other constructs.

The metaphors associated or connected with each construct are the sensory definitions of those constructs. They convey the important nonverbal meanings of these constructs. It is these meanings which are often missing from market research. This is partially due to the fact that verbal skills of those whose input is being solicited vary widely. It has been found however that in employing the MET, the verbal skills of a customer are not critical since the visual sensory development of persons is relatively more advanced than verbal development. Therefore, education level of a customer is not critical to the MET. Generally customers using the MET are more equal on a sensory level than they are on a verbal skills level. This in turn contributes to the accuracy and consisting of responses generated.

The MET presently runs on the Apple Mackintosh family of computers. However, the MET can also be implemented on IBM and IBM compatible computers employing the Intel ® 80386, 80486 family of processors. Input scanners such as the Apple OneScanner Polaroid CS-5000 Photo Print Scanner, the Microtek ScanMaker 1850S (35 mm slide/negative scanner) and the Microtek ScanMaker 6007S flatbed scanner are all appropriate scanners for use with the present invention.

Other input devices include the WACOM SD420E Digitizing Tablet for shape input and the delineate portions of images to be extracted as well as the CAL-COMP Drawing Board Roman II Digitizing Table for the same purpose.

Additional output devices include the LaserMaster 1000 and the GSC ColorFast Digital Film Recorder for providing hard-copy output of images created.

DETAILED DESCRIPTION OF THE PREFERRED EMBODIMENT

Figure 1:
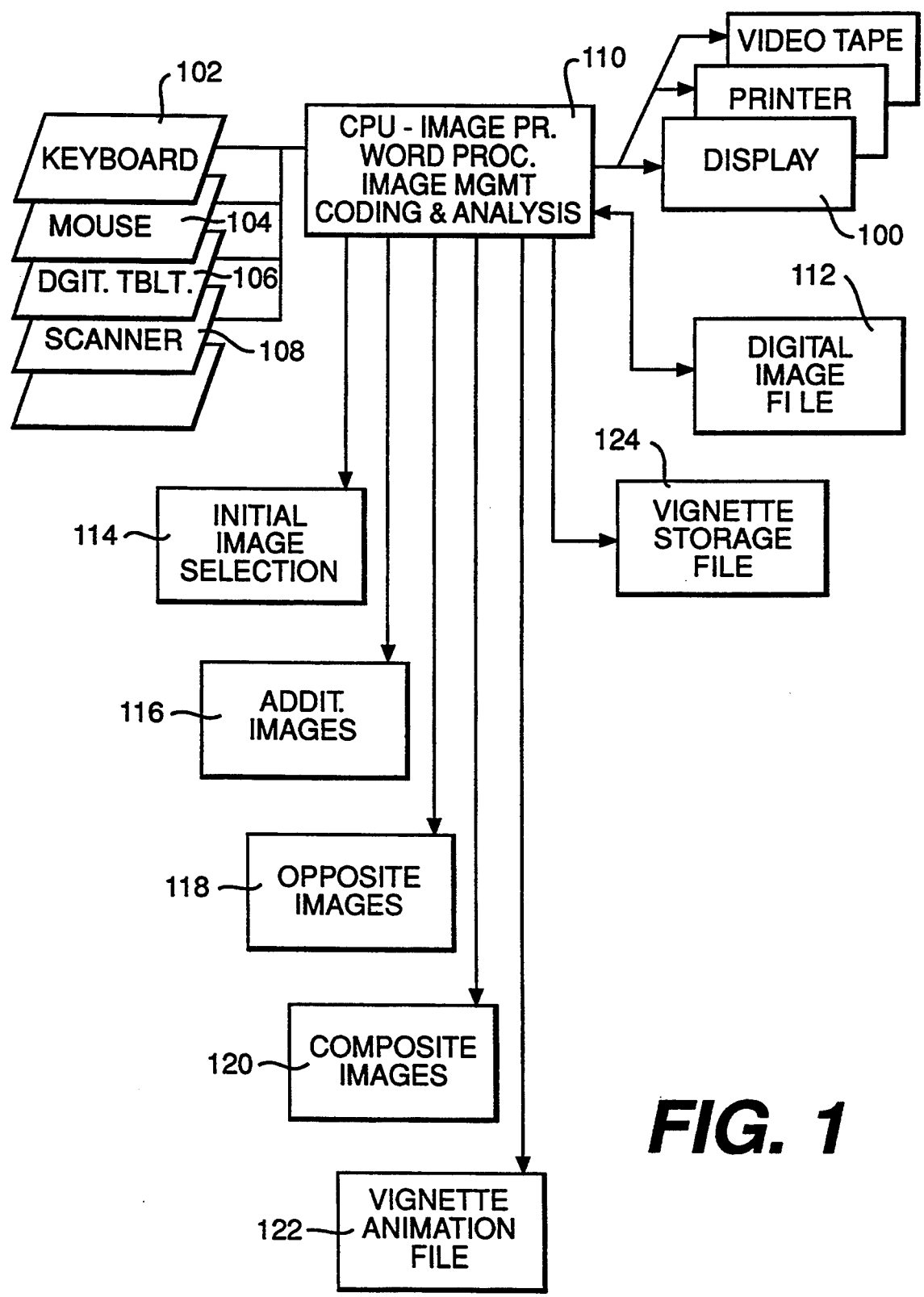
FIG. 1 —System architecture

Referring to FIG. 1 the MET apparatus is described. The apparatus comprises a display 100 for displaying alpha numeric data as well as the various images viewed by a customer. The apparatus further comprises a keyboard 102, a mouse 104, pressure sensitive digital tablet 106, and scanner 108, for reading slides, negatives, and pictures into the CPU 110 for inputting data and designating images or sections of images which are to be used in the creation of composite images or to merely designate those images to be stored.

The central processing unit 110 comprises various logic whereby input commands can be received from the keyboard 102, the mouse 104, and pressure sensitive digitizer tablet 106 to designate various images for subsequent processing and storage. The CPU 110 comprises image processing/management software for cutting and pasting portions of images from one into another as well as to allow the input of alpha numeric data. The CPU also comprises file management software allowing digital images to be received, displayed and stored. It also comprises file management software for computer animation. The CPU also contains software for coding and analyzing constructs, sensory metaphors, still images, vignettes, and certain aspects of customers' verbal language digitally recorded or entered by the researcher as written text. The CPU contains additional software that creates tables, graphs, consensus maps, and other analyses unique to MET and required for reporting research results. The CPU also contains software which helps guide the researcher and customers through the sequence of steps and through the activities within each step.

The digital image file 112 comprises a large library of digital images from which are selected images for the initial groupings and subsequent images as required for a customer during the course of any given study. This file includes visual images as well as those relating to the several other senses (Step 3).

The MET system also comprises a series of temporary storage files in which are stored the initial images selected for evaluation on 114, additional images selected by a customer 116 for use in the verbal image (Step 6) step, a file for opposite images 118 for use in the description of those images which are opposite to the concept being evaluated (Step 7), and a composite image file 120 in which is stored in the digital image created by the customer (Step 12) and comprising parts of all other images selected and temporarily stored a file of images 122 for use in the creation of a vignette (Step 13) and a file 124 for storing complete vignettes.

During the Step 1 of the MET the customer is asked to describe the salient contents of each picture displayed. These salient or relevant characteristics are stored. The pictures are presented to the customer during Step 1 on the video display of the present invention. During this and other stages, the customer's verbal comments are audio recorded digitally, in the computer control processor.

During Step 2, of the invention, the customer is asked to sort the pictures into meaningful categories and provide a label or description for each category. There are no restrictions as to the number of categories or the number of pictures in each category. This sorting task helps establish the major themes or constructs relevant to a particular customer. In addition, the sorting task is used as precursor to Step 4, the further elicitation of constructs using probing interviewing.

In Step 3 of the present invention the customer is asked to describe what are and what are not good sensory representations of the research topic. For example, people often use their senses to describe their experiences, thoughts or emotions.

During Step 3 the present invention elicits from a customer what is and is not the taste, touch, smell, color, and sound of the concept being explored. In addition the emotional feeling associated with the topic is also elicited. These sensory thoughts are recorded by the present invention during this step of the process.

In Step 4 of the present invention the customer is engaged in a discussion with the researcher which results in the elicitation of additional relevant constructs. The stimuli used for the elicitation of additional constructs are the pictures, picture groupings, and other sensory images identified and selected in steps 1 through 3. The elicitation of constructs is facilitated by the use of probing interviewing techniques designed for MET.

In Step 5 the most representative picture is selected from the group of pictures initially provided by the present invention during Step 1 and augmented by pictures the customer brings to the researcher. The picture selected is that which is most expressive or representative of the assigned topic. It is important to note that this picture is often used as a starting point for the summary image of Step 12 (to be discussed below).

During Step 6 other images are recalled from the memory of stored images of the present invention. These pictures are those which are deemed relevant by the customer to the topic being described. This step is critical since the pictures originally shown to the customer may not be those most appropriate given that customer's background and perception. Also, pictures the customer wanted to bring to the meeting with the researcher may not have been available to the customer. These additional images are also relevant to the Step 12 development of the summary image.

During Step 7 opposite images are selected by a customer. Certain research has shown that any concept or construct contains a reference also to its opposite meaning (Brunette and Wills, 1989). The customer is thus asked to retrieve pictures that might describe the opposite of the topic being studied. For example, if the original assignment concerned the meaning of "coffee as a morning wakeup beverage," the customer is asked what pictures would not reflect the concept of coffee as a morning wake up beverage. Such pictures are selected from the file of stored images in the present invention and subsequently stored as a response of that particular customer.

Step 8 provides the customer an opportunity to describe how he or she thinks the companies involved with a certain product think of their customers. The customer illustrates these thoughts with images from the present invention. Market research tools are almost always focused on eliciting what customers' think of a product, brand, or company. While this is important, a person's response to a service provider or to a product also depends on how they feel they are perceived. Thus, how a customer or patient believes an HMO's physicians or other staff think of them will influence that person's decision to use that HMO and, if they join, will also influence their use of medical services.

Step 9 enables the customer to identify the most important thought they have which they feel a company should understand. The sensory images associated with the thought are selected by the customer (from within the apparatus) to help convey their thinking.

Step 10 identifies information that the customer thinks will be surprising to a company, i.e. information that the customer thinks the company is least prepared to hear. This provides additional perspective about how well informed customers feel companies are about their needs. Here, too, customers' thinking is clarified by the use of sensory images drawn from the present invention.

Step 11 is the creation of a mental map or model involving the constructs of the person viewing the pictures. The customer reviews all of the constructs recorded by the present invention and verifies that they are accurate or whether there are important ideas missing from the list of constructs. These constructs are then graphically linked to one an other based upon relationships established by the customer and stored by the system. This forms the mental model, or the mental map. This map is entered into the central processor unit. The customer provides a brief description of the map which is audio recorded digitally in the computer.

After completing the mental map, the customer creates a summary image or digital montage which expresses the topic under study (Step 12). This is done using the images already selected together with the graphical ability of the present invention to combine images or portions of images to create a single summary image. All of the pictures selected by a particular customer are stored in the computer. Additional images are also available from the stored file of images of the present invention. During this step the customer can use one picture as a background for the new image and add elements from other pictures and augment these with new art work. Using image processing and manipulation techniques, the customer can rearrange and alter the subject, the foreground, the background, or specific elements including color, object size, shapes, positions, and even textures appearing within an image to be more expressive of the concept under study. For example, a person dressed in a particular way may be expressive of a particular automobile concept. Such a person captured in one photograph can be "cut" moved to a clip board, resized, placed at a different angle, and have the color of clothing changed, and then "pasted" electronically onto another picture containing other meaningful information. The "cut-out" image could also come from a tool box or collection of pictures maintained in the separate image file. The customer's description of the significance of this image is audio digital recorded and made a part of the picture file. This image can also be printed or recorded on film to create a hard copy record of the picture created.

After completing the summary still image (Step 12) the customer next describes a movie-like vignette or video in which action or motion is involved (Step 13). Thus a customer describing coffee as a morning wake-up beverage may describe someone in a farm setting, walking to the road to get the newspaper from a mail box, the sun rising, a rooster crowing in the background, and the same person returning to enter a kitchen where a mug of steaming hot coffee is waiting. This vignette is readily created using computer animation techniques and may require less than one minute to play when completed. The customer's description of the significance of this vignette is audio recorded digitally and made part of the vignette.

The information provided by steps 12 and 13 complement one another and often produces new constructs and/or new insights about previously identified constructs.

The final step in the process (Step 14) is the creation of the consensus map by the researcher. The images and constructs elicited during use of the present invention, the development of each customer's mental model, and the digitized images created provide the data base from which the consensus map is generated. The consensus map describes a) most of the thinking of, b) most of the people, c) most of the time. Thus the data from all customers are aggregated and developed into a consensus map.

This consensus map contains the most important set of constructs that influences customer perception, understanding and behavior. These constructs are then used to guide the development and implementation of a marketing campaign for a particular product.

Figure 2:
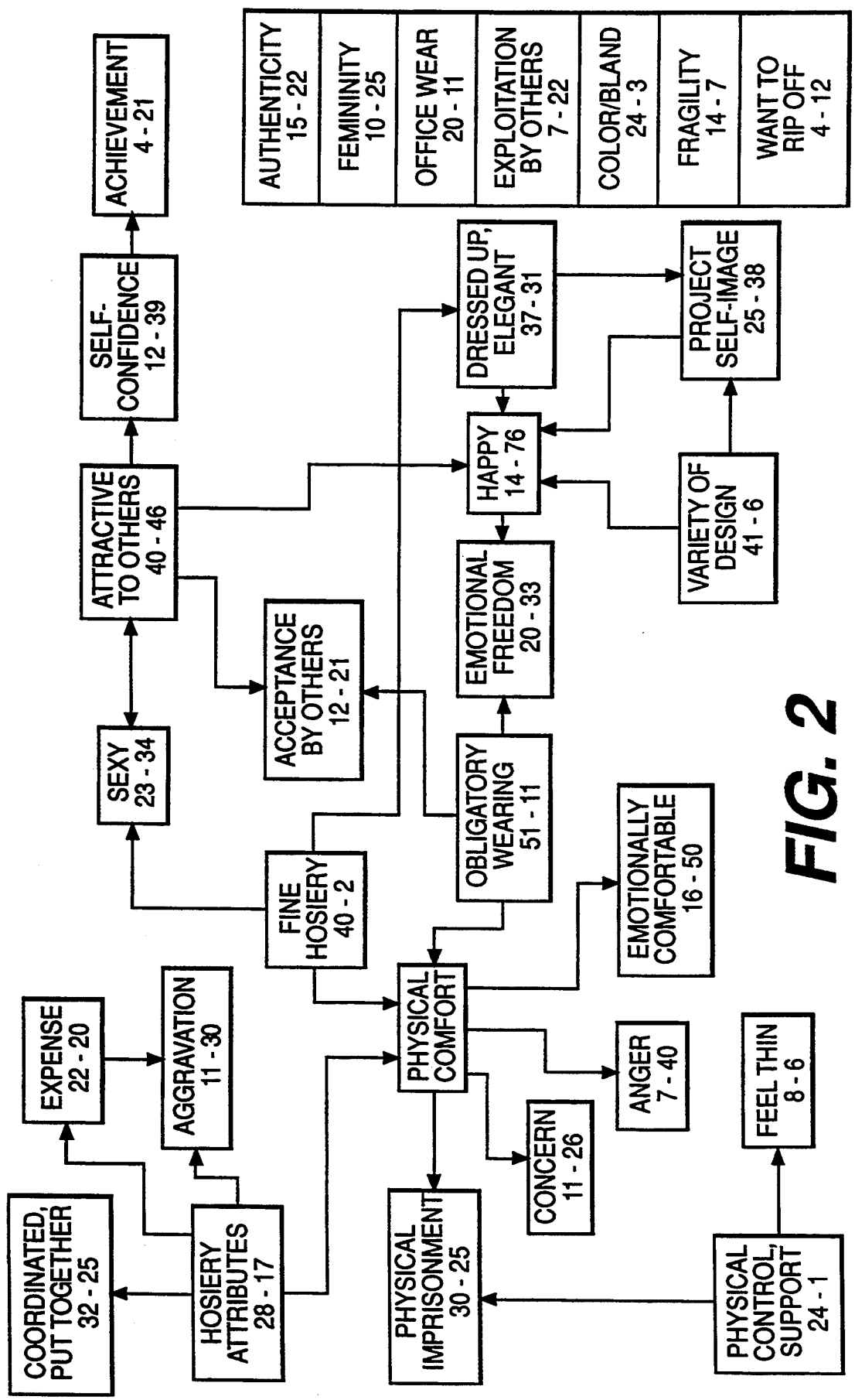
FIG. 2 —Consensus map example: Hosiery wearing experience

FIG. 2 shows an example of a consensus map. In this example, the subject product was hosiery. Various constructs directed toward the hosiery were elicited from the participating subjects. Some construct examples shown in the figure are self-confidence, emotional freedom, and aggravation. In all, thirty different constructs were mentioned by at least ten of the 25 subjects. Sometimes a subject noted a relationship between two or more of the constructs she mentioned. For example, some subjects linked the construct of self-confidence to the construct of achievement, meaning that in her mind, these distinct attributes were related.

Of the thirty constructs mentioned by at least ten of the subjects, 23 were mentioned at least five times as being related to another construct. The 23 constructs are shown drawn within ovals in FIG. 2. Arrows are shown drawn between these ovals. The oval from which the arrow originates contains the construct which is the origination point in that construct's relationship with the construct resident in the oval upon which the arrow terminates. The originating construct is the attribute which the subject felt was the cause of the second construct. For example, some women thought that the construct of expense involved in wearing hosiery led to a construct of aggravation. In some cases, the arrow points in both directions between constructs.

Beneath each construct are two numbers separated by a hyphen. The number to the left of the hyphen indicates the number of times this construct was the origination point in the relationship with another construct. The number to the right of the hyphen indicates the number of times this construct was the destination point in a relationship with another construct.

The seven constructs listed in the rectangular box on the right side of FIG. 2 complete the original thirty constructs that were mentioned by ten or more of the 25 subjects.

How To Use

When a particular study is to be done concerning a topic, the market researcher initially selects a series of images for a customer to view. These images include those a customer brings to the meeting. This initial story telling (Step 1) provides basic images that describe the concept being evaluated.

The customer next sorts the images by designating on the display screen which images fall into a customer defined series of groups. This sorting task (Step 2) is done with the aid of a cursor, mouse or a stylus using a pressure sensitive digitizer tablet. The activated cursor selects the image.

During the sensory metaphor step (Step 3) the customer again uses the cursor, mouse or pen-like stylus to identify what are and are not good sensory representations of the research topic. Again, the customer may augment the existing file of sensory representation with their own sensory definitions.

During Step 4 the three visual images are selected randomly and their similarities and differences are explored using special techniques. The interviewing technique probes for basic meanings and connection to the research topic. The selection of groups of three images continues until the various associations amongst the images are defined.

During Step 5 the customer again through use of a cursor mouse or stylus pen indicates which is the most representative picture of the research topic.

Thereafter during Step 6, the customer is allowed to retrieve additional digital images from the digital image file 112 which may not have been in the original group of images displayed to the customer. The relevance of these images is then recorded via alpha numeric input.

The customer is next directed by the apparatus during Step 7 to retrieve images which describe the opposite of the topic being studied. These images are retrieved and appropriately stored.

During steps 8, 9, and 10 the customer describes how they feel companies think of them (step 8), what the most important thought is they would like to convey to companies involved with the product or service being studied (step 9), and what they feel these companies would be most surprised to learn about their customer's thinking (step 10). Sensory images associated with this information are selected or described by the customer. These images are appropriately stored. The customer's descriptive comments about these sensory images are also recorded using digital audio. Thus during a play back, the sensory image is brought to a display screen and the customer's voice is heard describing the relevance of that image.

During Step 11 the customer creates a graphical model of his or her thinking using the various constructs which have been elicited during the course of the analysis. This is accomplished via graphical and image programs stored in the CPU.

During Step 12 a summary digital image is created whereby a customer can cut and paste various portions of the different images collected into a montage or summary image depicting the concept being studied.

During Step 13 a movie-like vignette is created whereby the customer is able to create an animated representation of their thinking. Standard procedures are available to accomplish this. The animation is stored in the CPU along with an audio description of the animation provided by the customer.

Finally, during Step 14 the apparatus is used to diagrammatically represent the understanding among customers of the concept being studied and the relevance of the images revealed during the course of that study. From this information an approach to a marketing activity is then derived. The apparatus of this invention connects each verbal construct in the consensus map with representative visual and other sensory images. This provides marketing managers with far richer data than do other techniques and thus permits more effective marketing programs.

The techniques described in this specification, while specific to marketing analysis, are not limited to such tasks. For example, the field of social network analysis is also amenable to the application of the techniques described herein. Instead of visual metaphors for products, visual metaphors for people, organizations and positions within organizations would be elicited from customers. The output, or consensus map, would depict the various constructs and relationships among them as they relate to organizational or social network structure. These in turn would describe the strength of relationships and the attributes of particular individuals or groups of individuals within an organization. In the case of a vacant position, the customer would visually describe the attributes of the ideal person needed to fill such a position to name but a few such applications of the MET.

Summary

A metaphor elicitation process and apparatus is described which is used to give rise to more effective marketing campaigns. The method and apparatus is image processing based and allow visual and other sensory representations to be given to thoughts and attitudes of a customer about a given topic. Other configurations of the apparatus and steps of the process may be created without departing from the spirit of the invention as disclosed.

I claim:

1. A process for using a computer to elicit, organize, and link different forms of data to automatically generate and present a consensus map, comprising:
   a) establishing a series of baseline images in a first file in computer memory relating to a research topic;
   b) sorting of the baseline images into groups by a consumer, each of the groups having similar qualities;
   c) eliciting and storing sensory and emotional perceptions from the consumer regarding the research topic;
   d) eliciting and storing constructs from the consumer using an interview procedure;
   e) eliciting and storing of a baseline image from the consumer that correlates closest with the research topic;
   f) eliciting and storing of additional images from the consumer that correlate closest with the research topic;
   g) eliciting and storing of opposite images from the consumer that represent ideas opposite ideas represented by the research topic;
   h) automatically generating a graphical representation of relationships among the stored images and constructs;
   i) deriving a consensus map from a plurality of said graphical representations, each of said plurality of graphical representations being based on images and constructs of a different one of a plurality of consumers; and
   j) visually presenting the consensus map.

2. The process of claim 1, further comprising creating, by the consumer, of a composite digital image best depicting the research topic, the composite digital image comprising at least portions of the baseline images, additional images, and opposite images.

3. The process of claim 1, further comprising creating, by the consumer, of an animated vignette which describes, in visual terms, key aspects of the research topic.

4. The process of claim 1, further comprising eliciting and storing of a critical image from the consumer.

5. The process of claim 1, further comprising eliciting from the consumer and storing a description of the impression of a sponsor of the research topic toward the consumer.

6. The process of claim 1, further comprising eliciting from the consumer and storing information the consumer thinks would be surprising to a sponsor of the research topic.

7. The process of claim 1, further comprising recording digital voice signals in correlation with the eliciting and storing of images and constructs.

8. A metaphor elicitation apparatus, comprising:
   a) a central processor comprising image processing logic to create and manipulate digital images selected for a research topic;
   b) a display device connected to the central processor to display the digital images;
   c) a first input device disposed to provide alphanumeric data to the central processor;
   d) a second input device disposed to manipulate a computer cursor visible on the display device and indicative of alphanumeric data placement;
   e) a third input device disposed to manipulate image data visible on the display device;
   f) baseline digital image memory disposed to store baseline digital images and to provide the baseline digital images to the central processor for manipulation and display;

g) second digital image memory disposed to store additional digital images and to provide the additional digital images to the central processor for manipulation and display; and h) third digital image memory disposed to store opposite digital images and to provide the opposite digital images to the central processor for manipulation and display;

i) the central processor generates a graphical representation of relationships among the stored images; and j) the central processor manipulates a plurality of graphical representations to derive a consensus map.

9. The apparatus of claim 8, wherein the central processor further manipulates stored images under control of the first input device, the second input device, and the third input device in order to generate and store a composite image.

10. The apparatus of claim 8, further comprising:
a) application memory disposed to store computer applications utilized by the data processor; and
b) an animation application stored in the application memory to create animation files based on the baseline data images, the additional data images, and the opposite data images;
c) the central processor to create and store vignettes from the stored images and constructs using the animation application.

11. The apparatus according to claim 8, further comprising an image scanner connected to the central processor and to the second digital image memory.

12. The apparatus according to claim 9, further comprising an image output device disposed to create a hard copy representation of the baseline digital images, the additional digital images, the opposite digital images, and the composite image.

13. The apparatus according to claim 12, wherein the image output device is selected from the group of devices consisting of laser printers and digital film recorders.

14. The apparatus according to claim 12, further comprising a graphics creation device disposed to create a consensus map for the research topic based on the baseline image, the additional image, the opposite image, and the composite image.

* * * * *